United States Patent
Tanomoto

(10) Patent No.: US 10,990,538 B2
(45) Date of Patent: Apr. 27, 2021

(54) ARITHMETIC PROCESSING DEVICE, INFORMATION PROCESSING APPARATUS, AND METHOD FOR CONTROLLING ARITHMETIC PROCESSING DEVICE

(71) Applicant: FUJITSU LIMITED, Kanagawa (JP)

(72) Inventor: Masakazu Tanomoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 16/419,414

(22) Filed: May 22, 2019

(65) Prior Publication Data
US 2019/0377689 A1 Dec. 12, 2019

(30) Foreign Application Priority Data
Jun. 8, 2018 (JP) .............................. JP2018-110741

(51) Int. Cl.
*G06F 12/10* (2016.01)
*G06F 12/1027* (2016.01)
*G06F 9/30* (2018.01)

(52) U.S. Cl.
CPC ........ *G06F 12/1027* (2013.01); *G06F 9/3001* (2013.01)

(58) Field of Classification Search
CPC .............. G06F 9/3001; G06F 12/1009; G06F 12/1027; G06F 12/145; G06F 12/1475; G06F 12/1491

USPC ........................ 711/145, 152, 163, 206, 207
See application file for complete search history.

(56) References Cited

U.S. PATENT DOCUMENTS

| | | | | |
|---|---|---|---|---|
| 10,002,084 | B1* | 6/2018 | Warkentin | G06F 12/1027 |
| 2015/0095610 | A1* | 4/2015 | Ben-Meir | G06F 12/1036 |
| | | | | 711/207 |
| 2017/0344492 | A1* | 11/2017 | Bolbenes | G06F 12/1027 |
| 2018/0113816 | A1* | 4/2018 | Hellwig | G06F 12/14 |

FOREIGN PATENT DOCUMENTS

JP 1-228037 9/1989

* cited by examiner

*Primary Examiner* — Gary J Portka
(74) *Attorney, Agent, or Firm* — Fujitsu Patent Center

(57) ABSTRACT

A TLB receives an access request with respect to a first address and access authorization assigned to the request from an arithmetic operation control unit, translates the first address to a second address, determines the suitability of the access authorization, and outputs the access request with respect to the first address when the access authorization is not suitable. An MMU receives the access request with respect to the first address output from the TLB, translates the first address to the second address, determines the suitability of the access authorization, and outputs a notification of access prohibition to the arithmetic operation control unit when the access authorization is not suitable.

8 Claims, 13 Drawing Sheets

FIG.7

| TAG PORTION | DATA PORTION | | |
|---|---|---|---|
| VIRTUAL ADDRESS | PHYSICAL ADDRESS | MINIMUM ACCESSIBLE PRIVILEGE LEVEL | INTER-MEDIATE ADDRESS |
| | | FIRST ACCESS AUTHORIZATION / SECOND ACCESS AUTHORIZATION | |

| ACCESS RIGHT DETERMINATION RESULT | TLB SEARCH RESULT | OPERATION PERFORMED BY CONVENTIONAL ARITHMETIC PROCESSING DEVICE | OPERATION PERFORMED BY ARITHMETIC PROCESSING DEVICE ACCORDING TO FIRST EMBODIMENT |
|---|---|---|---|
| PRESENCE OF ACCESS AUTHORIZATION VIOLATION (PROCESSOR PRIVILEGE LEVEL < REQUEST PRIVILEGE LEVEL) | MISS | ADDRESS TRANSLATION AND TLB REGISTRATION PERFORMED BY MMU EXCEPTION REPORTING PERFORMED BY TLB | ADDRESS TRANSLATION AND EXCEPTION REPORTING PERFORMED BY MMU |
| | HIT | EXCEPTION REPORTING PERFORMED BY TLB | ADDRESS TRANSLATION AND EXCEPTION REPORTING PERFORMED BY MMU |
| ABSENCE OF ACCESS AUTHORIZATION VIOLATION (PROCESSOR PRIVILEGE LEVEL ≥ REQUEST PRIVILEGE LEVEL) | MISS | ADDRESS TRANSLATION AND TLB REGISTRATION PERFORMED BY MMU TLB HIT THEREAFTER | ADDRESS TRANSLATION AND TLB REGISTRATION PERFORMED BY MMU TLB HIT THEREAFTER |
| | HIT | TLB HIT | TLB HIT |

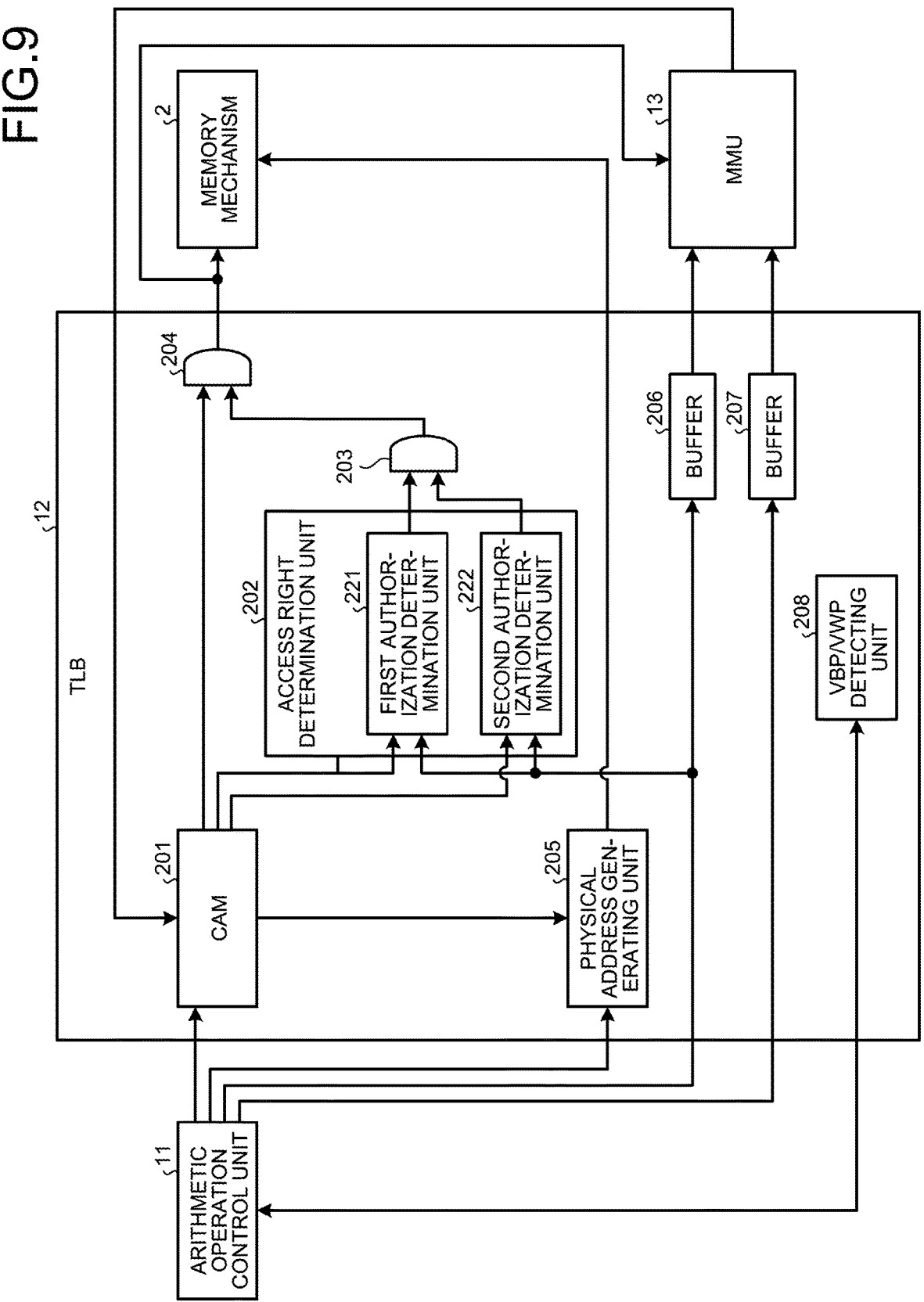

ARITHMETIC PROCESSING DEVICE, INFORMATION PROCESSING APPARATUS, AND METHOD FOR CONTROLLING ARITHMETIC PROCESSING DEVICE

CROSS-REFERENCE TO RELATED APPLICATION

This application is based upon and claims the benefit of priority of the prior Japanese Patent Application No. 2018-110741, filed on Jun. 8, 2018, the entire contents of which are incorporated herein by reference.

FIELD

The embodiments discussed herein are related to an arithmetic processing device, an information processing apparatus, and a method for controlling the arithmetic processing device.

BACKGROUND

A processor functioning as an arithmetic processing device has a virtual memory for convenience of software. The virtual memory is a technology for defining, for example, virtual memory space that is greater than the capacity of a real memory included in a system and using a part of the virtual memory space by mapping the space into the real memory. The CPU can allow software to use the memory space that is greater than the real memory space by executing the software by switching the mapping with respect to the virtual memory space.

The processor performs a translation process for translating addresses in order to associate a virtual address that is the address of the virtual memory space used by the software with a physical address that is the address of the real memory space that is physically present. Because a penalty is large in processing time of address translation including a process for reading from a main storage device performed multiple times, a translation lookaside buffer (TLB) is used to speed up the processing time. The TLB is a cache mechanism constituted by hardware in which sets of physical addresses associated with virtual addresses that have been translated once are registered.

If a subsequent command accesses to a virtual address registered in a TLB, it is possible to acquire a physical address corresponding to a translation result without passing through a memory management unit (MMU). When a TLB is used in this way, a translation process is shortened and thus it is possible to speed up the address translation.

To speed up the address translation by shortening the address translation is the first purpose for the TLB; however, in addition to this, the TLB also performs exception handling. Here, access authorization violation will be described as an example of the exception handling. In order to protect highly confidential information, such as passwords, in memory space, authorization of software that can be accessed is defined for each area. This authorization is generally represented by privilege levels. If software attempts to access a memory area that is not authorized for the privilege level given to the software, hardware detects an authorization violation and generates an exception without reading a value of the protected memory.

To execute the exception handling, the TLB has an access authorization judgement circuit that holds information on privilege levels that enables to access the subject area in addition to the physical address and that compares the information with the privilege level given to the software that requests an access to the subject area. Then, conventionally, the TLB judges access authorization and, if the TLB detects an authorization violation, the TLB performs exception handling that reports an exception. If malicious software accesses a protected area, reading of the value stored in the protected memory attempted by the software is prohibited due to the occurrence of an exception of authorization violation.

Furthermore, as a technology for address translation, there is a conventional technology for storing error information in a content-addressable memory at the time of miss hit of the content-addressable memory and detecting, if a hit occurs in the error information next time, an access right violation by reading out the error information.

Patent Document 1: Japanese Laid-open Patent Publication No. 01-228037

In the conventional TLB, if an associated set of a target subject physical address and a virtual address has been registered, because a cached value is read, the process of address translation is completed fast. However, if an association set of the target subject physical address and the virtual address has not been registered, after having performed the address translation, the TLB again performs a search and thus the process of the address translation is delayed. In contrast, in the conventional TLB, as described above, the process of the exception handling is completed fast.

Based on this, it is possible for malicious software to perform a timing attack on an arithmetic processing device. The timing attack is a technique for randomly accessing virtual memory space; observing, based on the relationship between presence or absence of the occurrence of an exception with respect to an access and the time taken to perform a process, a TLB registration area used by software having a high privilege level; and using the observed area as the clue for an attack. Namely, in the conventional TLB, a problem occurs in a security vulnerability in which software having a lower privilege level can observe an area used by software having a higher privilege level. Furthermore, because software in which an access authorization violation occurs is usually software having bugs, performing exception handling by using a TLB at a high speed is not generally considered as an advantage.

Furthermore, in the conventional technology for detecting an access right violation by using error information acquired when a miss hit occurs, because a processing time difference between at the time of exception handling and miss hit, the possibility that a timing attack is performed is not decreased and thus it is difficult to improve the safety of the system.

SUMMARY

According to an aspect of an embodiment, a arithmetic processing device includes: an arithmetic operation control unit; a first access management unit that receives an access request with respect to a first address and access authorization assigned to the access request from the arithmetic operation control unit, that translates the first address to a second address, that determines the suitability of the access authorization, and that outputs, when the access authorization is not suitable, the access request with respect to the first address; and a second access management unit that receives the access request with respect to the first address output from the first access management unit, that translates the first address to the second address, that determines the suitability of the access authorization, and that outputs, when the access authorization is not suitable, a notification of access prohibition to the arithmetic operation control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a format of a conventional TLB entry;

FIG. 8 is a diagram illustrating comparison between a memory access process performed by a conventional arithmetic processing device and a memory access process performed by the arithmetic processing device according to the first embodiment;

FIG. 9 is a block diagram illustrating a detail of a TLB according to a second embodiment;

DESCRIPTION OF EMBODIMENTS

Preferred embodiments of the present invention will be explained with reference to accompanying drawings. Furthermore, the arithmetic processing device, the information processing apparatus, and the method for controlling the arithmetic processing device disclosed in the present invention are not limited to the embodiments described below.

[a] First Embodiment

Figure 1:
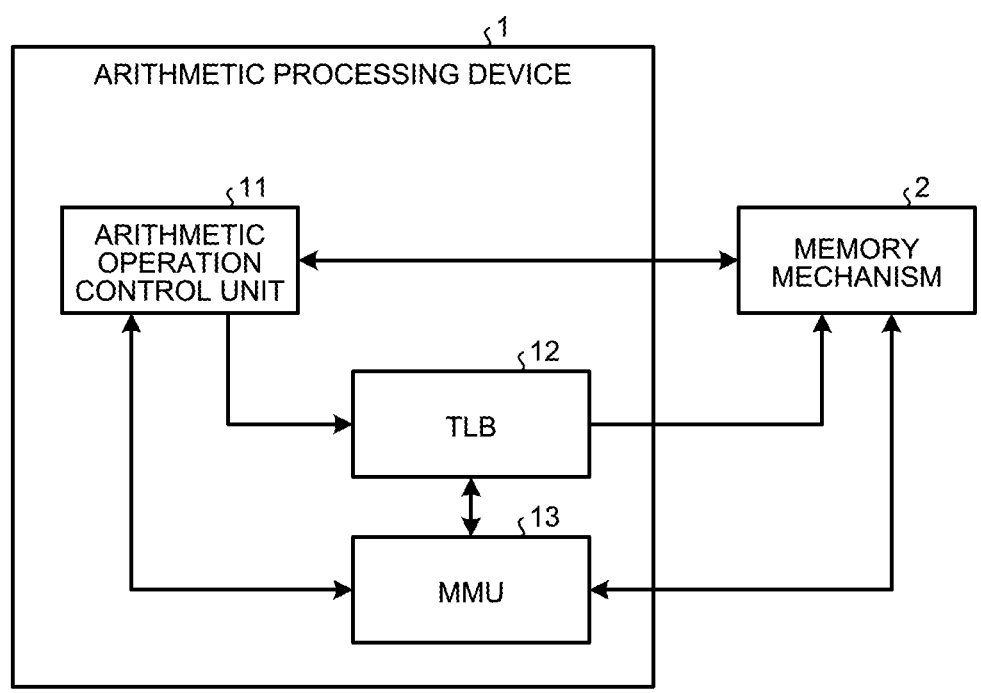
FIG. 1 is a block diagram illustrating an arithmetic processing device.

FIG. 1 is a block diagram illustrating an arithmetic processing device. As illustrated in FIG. 1, an arithmetic processing device 1 that is a central processing unit (CPU) includes an arithmetic operation control unit 11, a TLB 12, and a memory management unit (MMU) 13. Furthermore, the arithmetic processing device 1 is connected to a memory mechanism 2.

The arithmetic operation control unit 11 executes a command and performs arithmetic processing. Then, if an access to the memory mechanism 2, such as reading or writing of data, occurs when the arithmetic processing is being executed, the arithmetic operation control unit 11 outputs, to the TLB 12, a TLB request together with a virtual address. Furthermore, the arithmetic operation control unit 11 outputs, to the TLB 12, a processor privilege level to be used in a process of performing the TLB request.

Thereafter, if a TLB hit occurs in the TLB 12, the arithmetic operation control unit 11 notifies the memory mechanism 2 of the virtual address, accesses the physical address sent to the memory mechanism 2 as a notification by using the TLB 12, and performs a process of reading or writing the data with respect to the area.

Furthermore, if a TLB hit does not occur in the TLB 12, i.e., in a case of a TLB miss, the TLB 12 notifies the MMU 13 of an address translation request.

Furthermore, in a case of an access authorization violation, the arithmetic operation control unit 11 receives, from the MMU 13, an input of exception information including an exception reporting of the access authorization violation and the address that causes the occurrence of the access authorization violation. In this case, the arithmetic operation control unit 11 notifies, for example, a user of the access authorization violation and the exception information.

Figure 2:
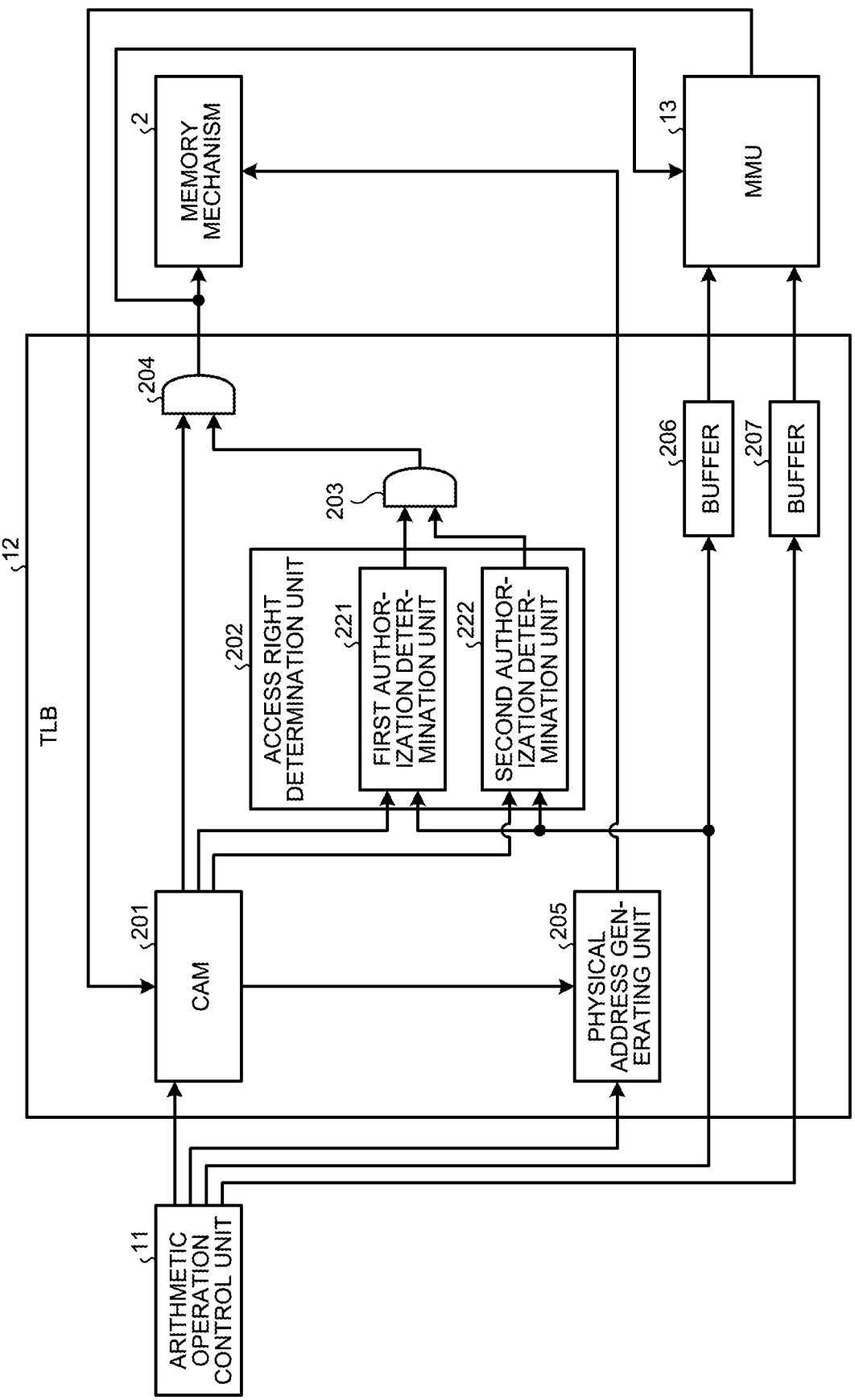
FIG. 2 is a block diagram illustrating a detail of a TLB according to a first embodiment.

FIG. 2 is a block diagram illustrating a detail of the TLB according to the first embodiment. As illustrated in FIG. 2, the TLB 12 according to the embodiment includes a content addressable memory (CAM) 201, an access right determination unit 202, AND circuits 203 and 204, a physical address generating unit 205, and buffers 206 and 207. The TLB 12 mentioned here corresponds to an example of a "first access management unit".

Figure 3:
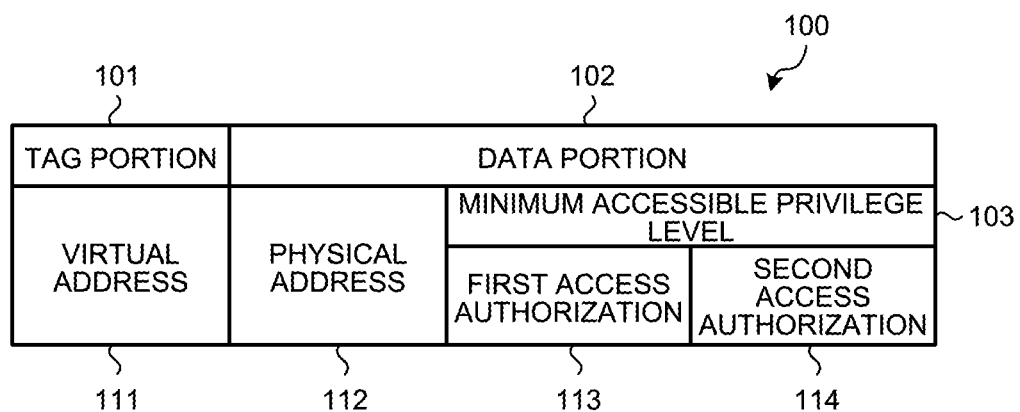
FIG. 3 is a diagram illustrating an example of a format of a TLB entry according to the first embodiment.

The CAM 201 stores therein a TLB entry having a format 100 illustrated in FIG. 3. FIG. 3 is a diagram illustrating an example of the format of the TLB entry according to the first embodiment.

As indicated by the format 100 illustrated in FIG. 3, the TLB entry includes a tag portion 101 and a data portion 102. Then, the tag portion 101 has an area 111 that stores therein a virtual address. Furthermore, the data portion 102 has an area 112 that stores therein a physical address and an area 103 that stores therein a minimum accessible privilege level. However, in the embodiment, the area 112 of the TLB entry stores therein, a higher level part of the physical address, i.e., a page part, instead of storing all of the physical addresses.

The area 103 for the minimum accessible privilege level includes an area 113 that stores therein information on first access authorization and an area 114 that stores therein information on second access authorization. The first access authorization mentioned here is authorization for the minimum accessible privilege level used in a state in which an input virtual address has been translated by using a page table. The second access authorization mentioned here is authorization for the minimum accessible privilege level in a state in which an intermediate address obtained by translating an input virtual address has been translated by using a page table.

The privilege levels mentioned here are levels for authorization given to a CPU at the time of processing a program. In some cases, the privilege levels have, for example, two levels having a user level and a system program level or four levels by dividing the system program into levels of an OS, a hypervisor, and firmware. The first access authorization is an authorization level obtained when a virtual address is translated for the first time. In contrast, the second access authorization is an authorization level that can be obtained at the translation that is performed second time based on the address obtained from translation performed first time.

Here, in FIG. 3, an example of almost the minimum configuration is illustrated as a TLB entry; however, information other than this may also be included. For example, in the TLB entry, an address space identifier (ID) or the attribute of a physical address that are shared in a plurality of processes may also be included. Furthermore, in the embodiment, the first access authorization and the second access authorization are registered in the TLB entry in order for the TLB 12 to be used in other processes performed by using access authorization with respect to each of the address translation results. However, if the TLB 12 is simply used to determine whether an access authorization violation has occurred, it may also possible to selectively register, in the TLB entry, a stricter request between the first access authorization and the second access authorization.

A description will be given here by referring back to FIG. 2. The CAM 201 receives an input of a TLB request and a virtual address from the arithmetic operation control unit 11. Then, the CAM 201 determines whether, in the TLB entry held by the CAM 201, the input virtual address registered in the tag portion is present in the TLB entry.

If an entry in which the input virtual address is registered is present, the CAM 201 outputs, to the AND circuit 204, a signal indicating a CAM hit. Then, the CAM 201 outputs, to a first authorization determination unit 221, the information on the first access authorization stored in the TLB entry in which a CAM hit has occurred. Furthermore, the CAM 201 outputs, to a second authorization determination unit 222, information on the second access authorization stored in the TLB entry in which the CAM hit has occurred. Furthermore, the CAM 201 outputs, to the physical address generating unit 205, a higher level part of the physical address stored in the TLB entry in which a CAM hit has occurred.

In contrast, if an entry in which an input virtual address is registered is not present, the CAM 201 disables the signal that indicates a CAM hit and that is to be output to the AND circuit 204 and then sets the signal indicating a CAM miss. In this case, the information stored in the TLB entry is not used and the CAM 201 does not perform an output to the access right determination unit 202 and the physical address generating unit 205.

The virtual address mentioned here corresponds to an example of a "first address" and the physical address mentioned here corresponds to an example of a "second address". Furthermore, information used for acquiring a physical address associated with a certain virtual address stored in the CAM 201 corresponds to an example of "association relationship" and information that is obtained by collecting all pieces of information related to the "association relationship" and that is stored in the CAM 201 corresponds to an example of "association information".

The access right determination unit 202 includes the first authorization determination unit 221 and the second authorization determination unit 222. The first authorization determination unit 221 receives an input of information on the first access authorization from the CAM 201. Furthermore, the first authorization determination unit 221 receives an input of a processor privilege level from the arithmetic operation control unit 11. Then, the first authorization determination unit 221 determines whether the input processor privilege level is higher than the privilege level of the first access authorization. If the input processor privilege level is higher than the privilege level of the first access authorization, the first authorization determination unit 221 enables a signal indicating access permission and outputs the signal to the AND circuit 203. In contrast, if the input processor privilege level is less than the privilege level of the first access authorization, the first authorization determination unit 221 disables the signal indicating the access permission and outputs the signal to the AND circuit 203.

The second authorization determination unit 222 receives an input of information on the second access authorization from the CAM 201. Furthermore, the second authorization determination unit 222 receives an input of the processor privilege level from the arithmetic operation control unit 11. Then, the second authorization determination unit 222 determines whether the input processor privilege level is higher than the privilege level of the second access authorization. If the input processor privilege level is higher than the privilege level of the second access authorization, the second authorization determination unit 222 enables the signal indicating access permission and outputs the signal to the AND circuit 203. In contrast, if the input processor privilege level is less than the privilege level of the second access authorization, the second authorization determination unit 222 disables the signal indicating the access permission and outputs the signal to the AND circuit 203. The determination, performed by the first authorization determination unit 221 and the second authorization determination unit 222, whether a processor privilege level is higher than the minimum accessible privilege level corresponds to an example of a process for "determining the suitability of access authorization" performed by the first access management unit.

The AND circuit 203 receives an input of the signal indicating access permission output by the first authorization determination unit 221 and an input of the signal indicating access permission output by the second authorization determination unit 222. Then, the AND circuit 203 obtains a logical conjunction of the two input signals and outputs the result to the AND circuit 204. Namely, if any of the signal received from the first authorization determination unit 221 and the signal received from the second authorization determination unit 222 is disabled, the AND circuit 203 disables the output signal and then outputs the signal to the AND circuit 204. In contrast, both of the signal received from the first authorization determination unit 221 and the signal received from the second authorization determination unit 222 are enabled, the AND circuit 203 enables the output signal and outputs the signal to the AND circuit 204.

The AND circuit 204 receives an input of the signal indicating a CAM hit from the CAM 201. Furthermore, the AND circuit 204 receives an input of the output signal from the AND circuit 203. Then, the AND circuit 204 obtains a logical conjunction of the two input signals and outputs the result as a signal indicating a TLB hit to the memory mechanism 2. Namely, if any of the signal indicating a CAM hit received from the CAM 201 and an output signal received from the AND circuit 203 is disabled, the AND circuit 204 disables the signal indicating a TLB hit and outputs the signal to the memory mechanism 2. Namely, the AND circuit 204 outputs the signal indicating a TLB miss. In contrast, if both of the signal indicating a CAM hit received from the CAM 201 and the output signal received from the AND circuit 203 are enabled, the AND circuit 204 enables the signal indicating a TLB hit and outputs the signal to the memory mechanism 2. Namely, if a CAM hit occurs and, furthermore, if the processor privilege level if higher than the privilege level of the first access authorization and the privilege level of the second access authorization, the AND circuit 204 enables the signal indicating a TLB hit and outputs the signal to the memory mechanism 2.

Furthermore, an output from the AND circuit 204 is inverted and is sent to the MMU 13 as an address translation request. In a case of a TLB hit, because the signal obtained by inverting an output from the AND circuit 204 is disabled, an instruction of the address translation request is not input to the MMU 13. In contrast, in a case of a TLB miss, the signal obtained by inverting an output from the AND circuit 204 is enabled and thus an instruction of the address translation request is input to the MMU 13.

If a CAM hit occurs, the physical address generating unit 205 receives an input of a virtual address from the arithmetic operation control unit 11. Furthermore, the physical address generating unit 205 receives an input of an upper layer portion of the physical address from the CAM 201. Then, the physical address generating unit 205 generates a final physical address by combining the virtual addresses with respect to the upper layer portion of the input physical addresses and by generating a lower level part that is an index portion of the physical addresses. Then, the physical address generating unit 205 outputs the generated physical addresses to the memory mechanism 2.

The buffer 206 receives and holds an input of the processor privilege level from the arithmetic operation control unit 11. Then, at a timing at which an address translation request is input to the MMU 13, the buffer 206 outputs the processor privilege level to the MMU 13.

The buffer 207 receives and holds an input of the virtual address from the arithmetic operation control unit 11. Then, at a timing at which the address translation request is input to the MMU 13, the buffer 207 outputs the virtual address to the MMU 13.

Figure 4:
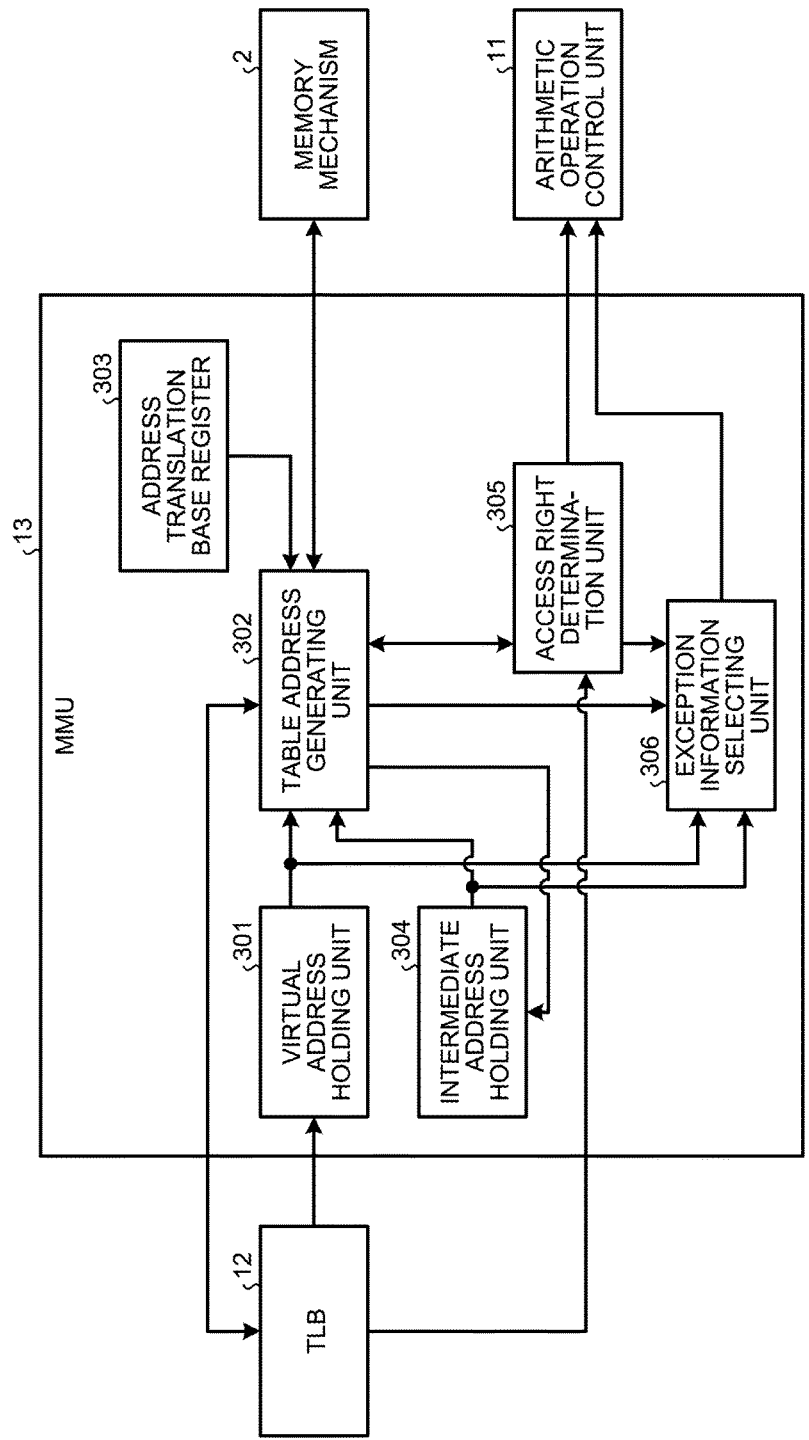
FIG. 4 is a block diagram illustrating a detail of an MMU.

In the following, the MMU 13 will be described with reference to FIG. 4. FIG. 4 is a block diagram illustrating a detail of the MMU. As illustrated in FIG. 4, the MMU 13 includes a virtual address holding unit 301, a table address generating unit 302, an address translation base register 303, an intermediate address holding unit 304, an access right determination unit 305, and an exception information selecting unit 306. The MMU 13 mentioned here corresponds to an example of a "second access management unit".

In response to an input of a virtual address from the buffer 207 in the TLB 12, the virtual address holding unit 301 holds the acquired virtual address. Then, if an address translation request is input to the table address generating unit 302, the virtual address holding unit 301 outputs the virtual address to the table address generating unit 302. Furthermore, the virtual address holding unit 301 outputs the virtual address to the exception information selecting unit 306.

The intermediate address holding unit 304 receives an input of an intermediate address from the table address generating unit 302, during a translation process for translating from a virtual address to a physical address performed by the table address generating unit 302, which will be described later, and then holds the acquired intermediate address. Then, the intermediate address holding unit 304 outputs the intermediate address to the table address generating unit 302. Furthermore, the intermediate address holding unit 304 outputs the intermediate address to the exception information selecting unit 306.

The address translation base register 303 holds a base address associated with each of the pieces of address translation performed by the table address generating unit 302. In a description below, a value of the base address held by the address translation base register 303 is referred to as a value of a base address register.

The table address generating unit 302 finally acquires a physical address associated with the virtual address by tracing a page table included in the memory mechanism 2 based on the input virtual address. The page table specifies a position of a virtual page in a physical memory included in the memory mechanism 2. A termination table is included in a page table. If the table address generating unit 302 traces the page table and reaches the termination table, the table address generating unit 302 acquires the address acquired by using the subject termination table as a physical address. More specifically, the table address generating unit 302 generates a subsequent address from the table information stored in the generated address and repeats the process until the table address generating unit 302 reaches the termination table and obtains a final output. The entire page table included in the memory mechanism 2 corresponds to an example of "translation information".

Here, a process for tracing a page table based on the virtual addresses is referred to as a page table walk. In address translation according to the embodiment, a description will be given of a case in which a physical address is finally acquired by performing the page table walk two times. Hereinafter, the address translation performed by using a page table obtained for the first time is referred to a first time page table walk and the address translation performed by using a page table obtained for the second time is referred to as a second time page table walk.

The table address generating unit 302 receives an input of the address translation request from the TLB 12. Then, the table address generating unit 302 acquires a virtual address from the virtual address holding unit 301. Then, the table address generating unit 302 acquires a value of the base address register in the first time page table walk from the address translation base register 303. Then, the table address generating unit 302 uses the virtual address and the value of the base address register and obtains the table address in which information related to the address translation is stored. Then, the table address generating unit 302 acquires, from the memory mechanism 2 by using the obtained table address, the page table and access authorization that are used in the first time page table walk. Here, the table address generating unit 302 acquires the first access authorization as access authorization.

Then, the table address generating unit 302 performs virtual address translation by using the acquired page table and acquires an intermediate address. Then, the table address generating unit 302 outputs the acquired intermediate address to the intermediate address holding unit 304. Furthermore, the table address generating unit 302 outputs, to the access right determination unit 305, the first access authorization that indicates the minimum accessible privilege level of the translation result at the time at which the first time page table walk was performed. Furthermore, during the period of time for which the first time page table walk is being performed, the table address generating unit 302 outputs, to the exception information selecting unit 306, the signal indicating that the first time page table walk is being performed.

Then, if the table address generating unit 302 receives a notification of access prohibition from the access right determination unit 305, the table address generating unit 302 ends the address translation. In contrast, if the table address generating unit 302 receives an input of a notification of access permission from the access right determination unit 305, the table address generating unit 302 acquires an intermediate address from the intermediate address holding unit 304. Furthermore, the table address generating unit 302 acquires the value of the base address register in the second time page table walk from the address translation base register 303. Then, the table address generating unit 302 uses the intermediate address and the value of the base address register and obtains the table address in which the information related to the address translation is stored. Then, the table address generating unit 302 acquires the page table and access authorization that are used in the second time page table walk from the memory mechanism 2 by using the obtained table address. Here, the table address generating unit 302 acquires the second access authorization as the access authorization.

Then, the table address generating unit 302 performs intermediate address translation by using the obtained page table and acquires the final physical address. Then, the table address generating unit 302 registers, in the CAM 201 in the TLB 12, a TLB entry in which the information on the acquired physical address and the access authorization are stored in the data portion. Furthermore, the table address generating unit 302 outputs, to the access right determination unit 305, the second access authorization indicating the minimum accessible privilege level of the translation result at the time at which the second time page table walk was performed. Furthermore, during the period of time for which the second time page table walk is being performed, the table address generating unit 302 outputs, to the exception information selecting unit 306, the signal indicating that the second time page table walk is being performed.

Then, if the table address generating unit 302 receives a notification of access prohibition from the access right determination unit 305, the table address generating unit 302 ends the page table walk. In contrast, if the table address generating unit 302 receives an input of a notification of access permission from the access right determination unit 305, the table address generating unit 302 outputs, to the TLB 12, the acquired physical address, the first address authorization, and the second address authorization together with the virtual address and then registers the output data in the TLB entry.

Figure 5:
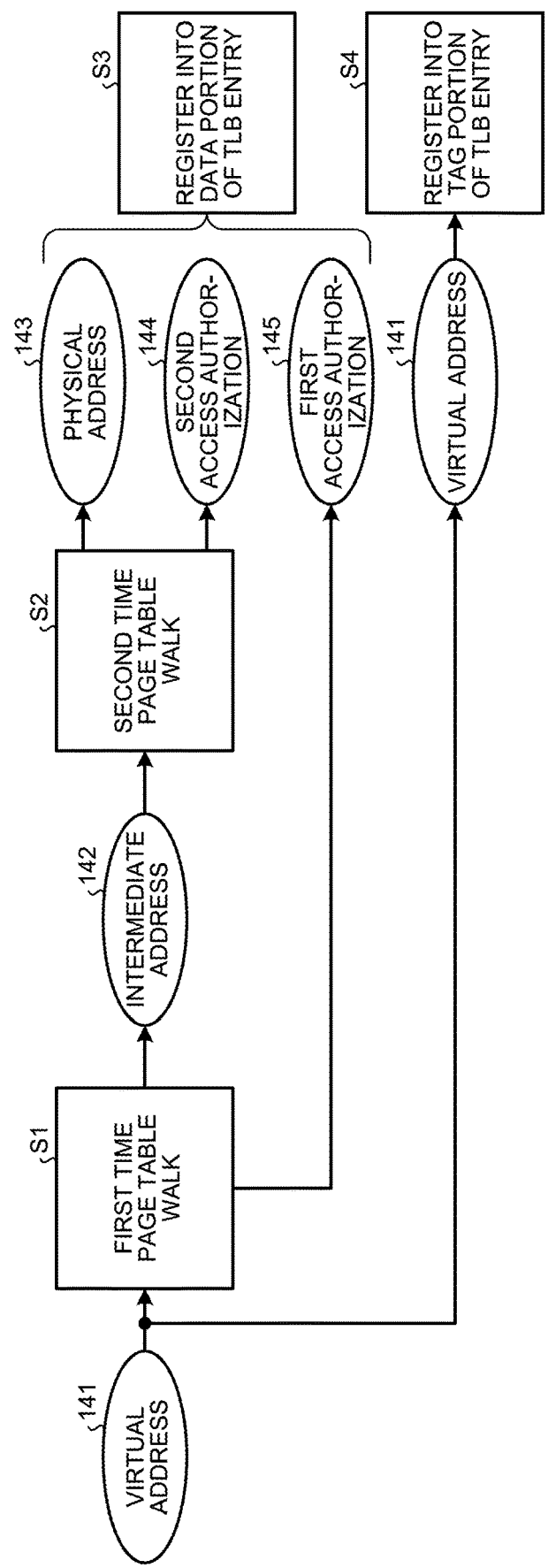
FIG. 5 is a diagram illustrating a page table walk.

Here, the overall flow of the page table walk according to the embodiment will be described with reference to FIG. 5. FIG. 5 is a diagram illustrating the page table walk. The table address generating unit 302 acquires a virtual address 141 as an input of the first time page table walk. Then, the table address generating unit 302 performs the first time page table walk by using the virtual address 141 (Step S1). The exception information in a case of access prohibition with respect to an output of the first time page table walk becomes the virtual address 141.

Furthermore, by performing the first time page table walk, the table address generating unit 302 acquires an intermediate address 142 and a first access authorization 145. Then, the table address generating unit 302 performs the second time page table walk in response to an input of the intermediate address 142 (Step S2). The exception information in a case of access prohibition with respect to an output of the first time page table walk becomes the intermediate address 142.

By performing the second time page table walk, the table address generating unit 302 acquires a physical address 143 and a second access authorization 144. Then, the table address generating unit 302 registers the physical address 143, the first access authorization 145, and the second access authorization 144 in the data portion of the TLB entry included in the CAM 201 (Step S3). Furthermore, the table address generating unit 302 registers the virtual address 141 in the tag portion of the TLB entry included in the CAM 201 (Step S4).

Here, in the embodiment, a description has been given of a case in which address translation is completed by the page table walk performed two times; however, the number of times of the page table walks is not particularly limited and a page table walk is repeatedly performed until a desired physical address is obtained as an output. The table walk mentioned here corresponds to an example of a process for "translating the first address to the second address" performed by the second access management unit.

A description will be given here by referring back to FIG. 4. The access right determination unit 305 acquires information on the processor privilege level from the buffer 206 in the TLB 12. Furthermore, the access right determination unit 305 receives, from the table address generating unit 302, an input of the first access authorization indicating the minimum accessible privilege level of the translation result at the time at which the first time page table walk has been performed. Then, the access right determination unit 305 determines whether the processor privilege level is higher than the privilege level of the first access authorization. If the processor privilege level is less than the privilege level of the first access authorization, the access right determination unit 305 outputs a notification of access prohibition to the table address generating unit 302. Furthermore, the access right determination unit 305 instructs the exception information selecting unit 306 to send a notification of exception information. Then, the access right determination unit 305 outputs an exception reporting including a notification of access authorization violation to the arithmetic operation control unit 11.

In contrast, if the processor privilege level is higher than the privilege level of the first access authorization, the access right determination unit 305 outputs a notification of access permission to the table address generating unit 302. Then, the access right determination unit 305 receives, from the table address generating unit 302, an input of the second access authorization indicating the minimum accessible privilege level of the translation result at the time at which the second time page table walk was performed. Then, the access right determination unit 305 determines whether the processor privilege level is higher than the privilege level of the second access authorization. If the processor privilege level is higher than the privilege level of the second access authorization, the access right determination unit 305 outputs a notification of access permission to the table address generating unit 302.

In contrast, if the processor privilege level is less than the privilege level of the second access authorization, the access right determination unit 305 outputs a notification of access prohibition to the table address generating unit 302. Furthermore, the access right determination unit 305 instructs the exception information selecting unit 306 to send a notification of exception information. Then, the access right determination unit 305 outputs an exception reporting including a notification of access authorization violation to the arithmetic operation control unit 11. The determination, performed by the access right determination unit 305, whether the processor privilege level is higher than the minimum accessible privilege level corresponds to an example of a process for "determining the suitability of access authorization" performed by the second access management unit.

The exception information selecting unit 306 acquires a virtual address from the virtual address holding unit 301. Furthermore, the exception information selecting unit 306 acquires an intermediate address from the intermediate address holding unit 304. Furthermore, the exception information selecting unit 306 receives, from the table address generating unit 302, an input of the signal indicating that the first time page table walk is being performed or a signal indicating that the second time page table walk is being performed.

Then, if the exception information selecting unit 306 receives, from the access right determination unit 305, an instruction to send a notification of exception information, the exception information selecting unit 306 checks the signal input from the table address generating unit 302. If the signal received from the table address generating unit 302 indicates that the first time page table walk is being performed, the exception information selecting unit 306 outputs a virtual address as exception information to the arithmetic operation control unit 11. In contrast, if the signal received from the table address generating unit 302 indicates that the second time page table walk is being performed, the exception information selecting unit 306 outputs an intermediate address as exception information to the arithmetic operation control unit 11.

In the embodiment, a description has been given by using the TLB 12 using the CAM 201 as an example; however, another storage element or configuration technique may also be used. For example, a random access memory (RAM) may also be used for the TLB 12.

Figure 6:
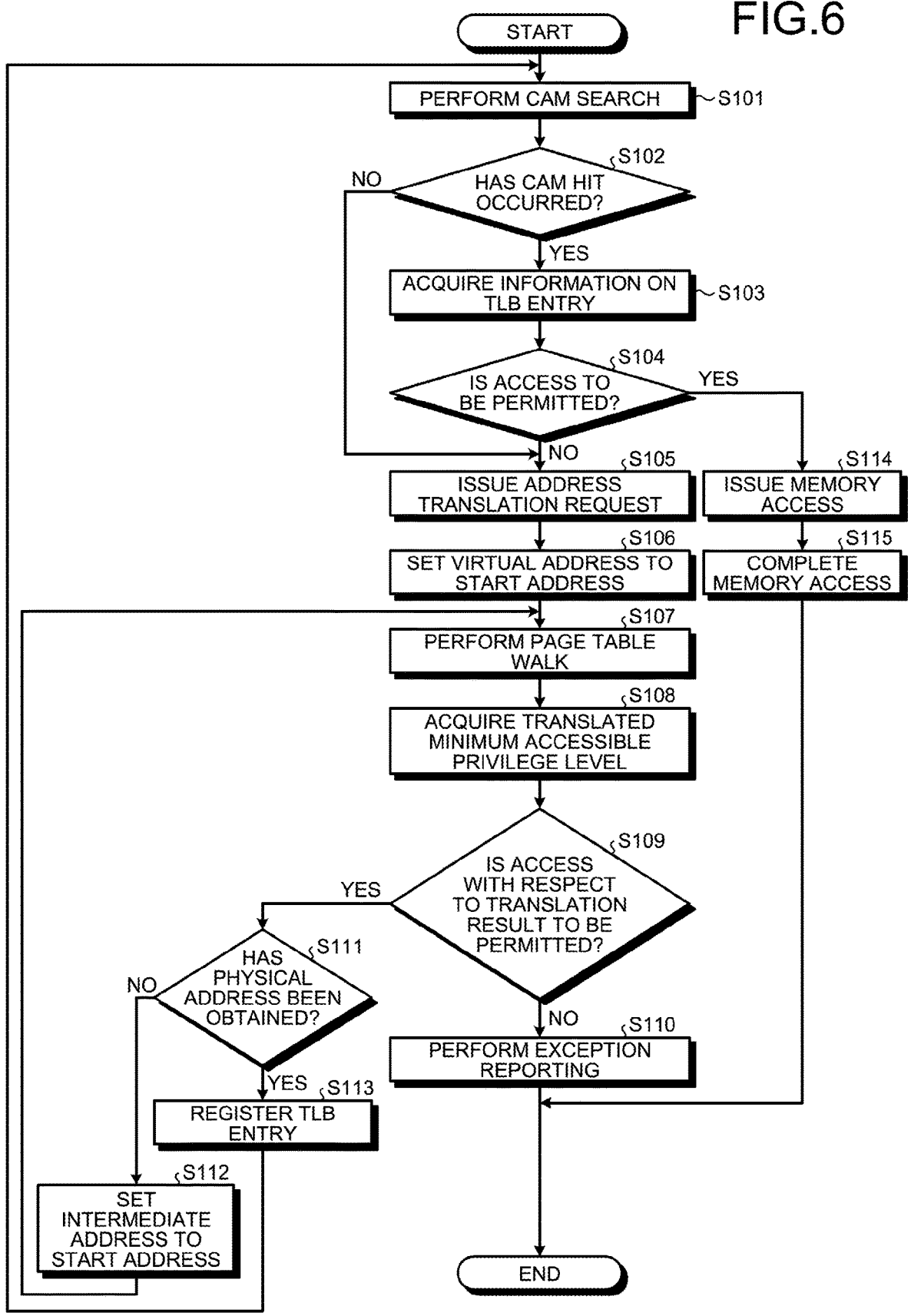
FIG. 6 is a flowchart illustrating a memory access process performed by the arithmetic processing device according to the first embodiment.

In the following, the flow of a memory access process performed by the arithmetic processing device 1 according to the embodiment will be described with reference to FIG. 6. FIG. 6 is a flowchart illustrating a memory access process performed by the arithmetic processing device according to the first embodiment.

The CAM 201 receives an input of each of the TLB request and a virtual address from the arithmetic operation control unit 11. Then, the CAM 201 performs a CAM search in order to search for information associated with the virtual address that has been input from among the registered TLB entries (Step S101).

The CAM 201 determines whether a CAM hit occurs based on presence or absence of information associated with the virtual address that has been input from among the registered TLB entries (Step S102).

In a case of a CAM hit (Yes at Step S102), the access right determination unit 202 acquires information on the first access authorization and the second access authorization in the hit TLB entry (Step S103).

Then, the access right determination unit 202 compares the processor privilege level received from the arithmetic operation control unit 11 with the first access authorization and the second access authorization and determines whether the access is to be permitted (Step S104). If the processor privilege level is higher than the first access authorization and is also higher than the second access authorization, the access right determination unit 202 determines that the state is access permission. Furthermore, if the processor privilege level is less than the first access authorization and is also less than the second access authorization, the access right determination unit 202 determines that the state is access prohibition.

In a case of a CAM miss (No at Step S102) and in a case of access prohibition (No at Step S104), the AND circuit 204 issues an address translation request to the MMU 13 (Step S105).

The table address generating unit 302 in the MMU 13 sets the virtual address input from the arithmetic operation control unit 11 to a start address (Step S106). The start address mentioned here indicates the address that is the target for address translation.

Then, the table address generating unit 302 performs a page table walk by using the start address (Step S107).

Then, the access right determination unit 305 acquires the minimum accessible privilege level with respect to the translation result obtained from the address translation process from the table address generating unit 302 (Step S108).

Then, the access right determination unit 305 compares the acquired minimum accessible privilege level with the processor privilege level and determines whether the access with respect to the translation result is permitted (Step S109). Specifically, if the processor privilege level is higher than the acquired minimum accessible privilege level, the access right determination unit 305 determines that the state is access permission. Furthermore, if the processor privilege level is less than the minimum accessible privilege level, the access right determination unit 305 determined the state is access prohibition.

In a case of access prohibition (No at Step S109), the access right determination unit 305 outputs exception reporting including information on access prohibition to the arithmetic operation control unit 11 (Step S110). At this time, the exception information selecting unit 306 outputs the input address obtained at this time as exception information to the arithmetic operation control unit 11. Then, the memory access process has been ended.

In contrast, in a case of access permission (Yes at Step S109), the access right determination unit 305 outputs a notification of access permission to the table address generating unit 302. In response to the notification of access permission, the table address generating unit 302 determines whether a physical address has been obtained as an output of the page table walk (Step S111).

If a physical address has not been obtained (No at Step S111), the table address generating unit 302 sets the intermediate address to the start address (Step S112), and returns to Step S107.

In contrast, if a physical address has been obtained (Yes at Step S111), the table address generating unit 302 registers the virtual address, the physical address, and each of the minimum accessible privilege levels in the TLB entry of the CAM 201 in the TLB 12 (Step S113). Then, the memory address access process returns to Step S101.

In contrast, If the access right determination unit 202 in the TLB 12 determines that the state is access permission (Yes at Step S104), the AND circuit 204 in the TLB 12 outputs a TLB hit to the memory mechanism 2 and then a memory access is issued (Step S114). The physical address generating unit 205 in the TLB 12 outputs the physical address generated from the virtual address to the memory mechanism 2.

The memory mechanism 2 uses the physical address acquired from the TLB 12 and performs, in accordance with a processing request, a process on a processing request for writing or reading data to be performed by using the virtual addresses received from the arithmetic operation control unit 11. Then, the memory mechanism 2 outputs the process result to the arithmetic operation control unit 11. In response to an input of a response to the processing request for writing or reading data by using the virtual address received from the memory mechanism 2, the arithmetic operation control unit 11 completes a memory access (Step S115).

Here, the TLB entry used by the arithmetic processing device 1 according to the embodiment is compared with a conventional TLB entry. FIG. 7 is a diagram illustrating an example of a format of a conventional TLB entry. As indicated by a format 115, in the conventional TLB entry, an intermediate address is registered. In this way, conventionally, because a TLB outputs notifications of exception reporting and exception information, the TLB holds an intermediate address for each translation level in a page table walk.

In contrast, the TLB 12 according to the embodiment does not output a notification of exception reporting or exception information even if an address authorization violation occurs, but the MMU 13 performs these processes. Thus, in the TLB 12, an intermediate address does not need to be registered in the TLB entry as illustrated in FIG. 3. In this way, in the TLB entry used by the arithmetic processing device 1 according to the embodiment, when compared with the conventional TLB entry, there is no need to provide an area 116 for storing an intermediate address. Furthermore, information is not limited to an intermediate address. Information can be deleted from the TLB entry used by the arithmetic processing device 1 according to the embodiment as long as the information is used during address translation or used at the time of exception reporting. In this way, with the arithmetic processing device 1 according to the embodiment, it is possible to reduce the storage area of the TLB 12 or make efficient use thereof.

In the following, a difference between a memory access process performed by a conventional arithmetic processing device and a memory access process performed by the arithmetic processing device according to the first embodiment will be described with reference to FIG. 8. FIG. 8 is a diagram illustrating comparison between a memory access process performed by a conventional arithmetic processing device and a memory access process performed by the arithmetic processing device according to the first embodiment.

In a case where an access authorization violation is present and a TLB miss occurs, with the conventional arithmetic processing device, an MMU performs address translation and TLB registration and then a TLB performs exception reporting. The TLB registration mentioned here indicates registration to a TLB entry. In contrast, with the arithmetic processing device 1 according to the embodiment, the MMU 13 performs exception reporting after the MMU 13 having performed address translation without performing TLB registration. Furthermore, in a case where an access authorization violation is present and a TLB hit occurs, with the conventional arithmetic processing device, exception reporting is performed by the TLB and a response is returned in a short time. In contrast, with the arithmetic processing device 1 according to the embodiment, the MMU 13 performs exception reporting after the MMU 13 having performed address translation without performing TLB registration. Furthermore, in a case where an access authorization violation is not present and a TLB miss occurs, with the conventional arithmetic processing device, the MMU performs address translation and TLB registration and then a TLB hit is notified from the TLB. This also applies to the arithmetic processing device 1 according to the embodiment. Furthermore, in a case where an access authorization violation is not present and a TLB hit occurs, with the conventional arithmetic processing device, a TLB hit is notified from the TLB. This also applies to the arithmetic processing device 1 according to the embodiment.

In this way, with the conventional arithmetic processing device, in a case where an access authorization violation is present and a TLB hit occurs, a response is returned in a very short time when compared with a case of a TLB miss. In contrast, with the arithmetic processing device 1 according to the embodiment, in a case where an access authorization violation is present and a TLB hit also occurs, address translation is performed by the MMU; therefore, a delay occurs by that amount a response is returned after elapse of time that is almost equal to the time taken in a case of a TLB miss. Accordingly, even if a timing attack is performed on the arithmetic processing device 1 according to the embodiment, it is difficult to distinguish an access authorization violation from a TLB miss and thus, it is difficult for malicious software to detect a vulnerable point of the security.

As described above, with the arithmetic processing device 1 according to the embodiment, in a case where a TLB hit occurs and an access authorization violation has also occurred, after the MMU 13 having performed address translation, the MMU 13 performs exception reporting to the arithmetic operation control unit 11. Namely, with the arithmetic processing device 1 according to the embodiment, response time is similar in both cases, i.e., in a case where a TLB hit occurs and an access authorization violation also occurs and in a case of a TLB miss. Consequently, in also a case of a timing attack, it is difficult to determine, based on a difference of the processing time, whether a TLB entry is present in the TLB 12 and it is possible to solve vulnerability of the security of the TLB 12.

Furthermore, the arithmetic processing device 1 according to the embodiment can eliminate pieces of information from the TLB entry that are used when address translation is being performed and at the time of exception reporting. Consequently, the arithmetic processing device 1 according to the embodiment can reduce the size of each of the TLB entries, which makes it possible to reduce the storage area of the TLB 12 or make efficient use thereof.

[b] Second Embodiment

FIG. 9 is a block diagram illustrating a detail of a TLB according to a second embodiment. The arithmetic processing device 1 according to the embodiment is different from the first embodiment in that the TLB 12 immediately returns exception reporting and exception information due to the factor other than an access authorization violation. The overall configuration of the arithmetic processing device 1 according to the embodiment is also indicated by FIG. 1. In a description below, a description of the function of each of the same unit as that described in the first embodiment will be omitted.

As illustrated in FIG. 9, the TLB 12 according to the embodiment includes, in addition to each of the units illustrated in FIG. 2, a virtual address break point (VBP)/virtual address watch point (VWP) detecting unit 208. The VBP/VWP detecting unit 208 mentioned here corresponds to an example of a "responding unit". The TLB 12 performs the same process as that performed in the first embodiment in a case where exception does not occur and in a case where an address authorization violation has occurred.

In contrast, the VBP/VWP detecting unit 208 receives an input of a virtual address. Then, the VBP/VWP detecting unit 208 determines whether the input virtual address is which points between the virtual address break point and the virtual address watch point. If the input virtual address is the virtual address break point, the VBP/VWP detecting unit 208 notifies the arithmetic operation control unit 11 of exception reporting and exception information related to the virtual address break point. Furthermore, if the input virtual address is the virtual address watch point, the VBP/VWP detecting unit 208 notifies the arithmetic operation control unit 11 of exception reporting and exception information related to the virtual address watch point. Namely, in a case where exception of the virtual address break point or the virtual address watch point has occurred, the arithmetic operation control unit 11 immediately receives a notification of the exception reporting and the exception information.

Here, in the embodiment, in addition to an access authorization violation, a description has been given of exception, such as a virtual address break point and a virtual address watch point; however, there are other types of exception included in the exception occurring in the arithmetic processing device 1. Among the pieces of exception, the exception that can be processed at a high speed does not weaken the security even if exception reporting is performed from the TLB 12. In terms of security, exception desired to hold information in a TLB entry preferably performs exception reporting from the MMU 13, similarly to an access authorization violation. In contrast, regarding an exception type that does not have any problem even if a difference between processing time is measured in terms of security, such as a virtual address break point and a virtual address watch point, exception reporting may also be performed from the TLB 12.

Furthermore, in a case of adding the viewpoint of reducing the TLB entry, exception reporting may also be performed from the TLB 12 after having added, in addition to the condition described above, a condition of an exception type indicating that information that can be obtained by performing address translation of intermediate addresses. The virtual address break point and the virtual address watch point also satisfy this condition.

As described above, in the embodiment, regarding exception type that does not have any problem even if a difference between processing time is measured in terms of security, the TLB 12 immediately performs exception reporting. Consequently, it is possible to reduce processing time of a specific exception type without decreasing a security level. Furthermore, it is also possible to use a configuration in which, regarding the exception type in which the condition for not using information that is obtained by further performing address translation, the TLB 12 immediately performs exception reporting. In this case, it is possible to reduce the processing time of a specific exception type while reducing the size of the TLB entry without decreasing the security level.

[c] Third Embodiment

Figure 10:
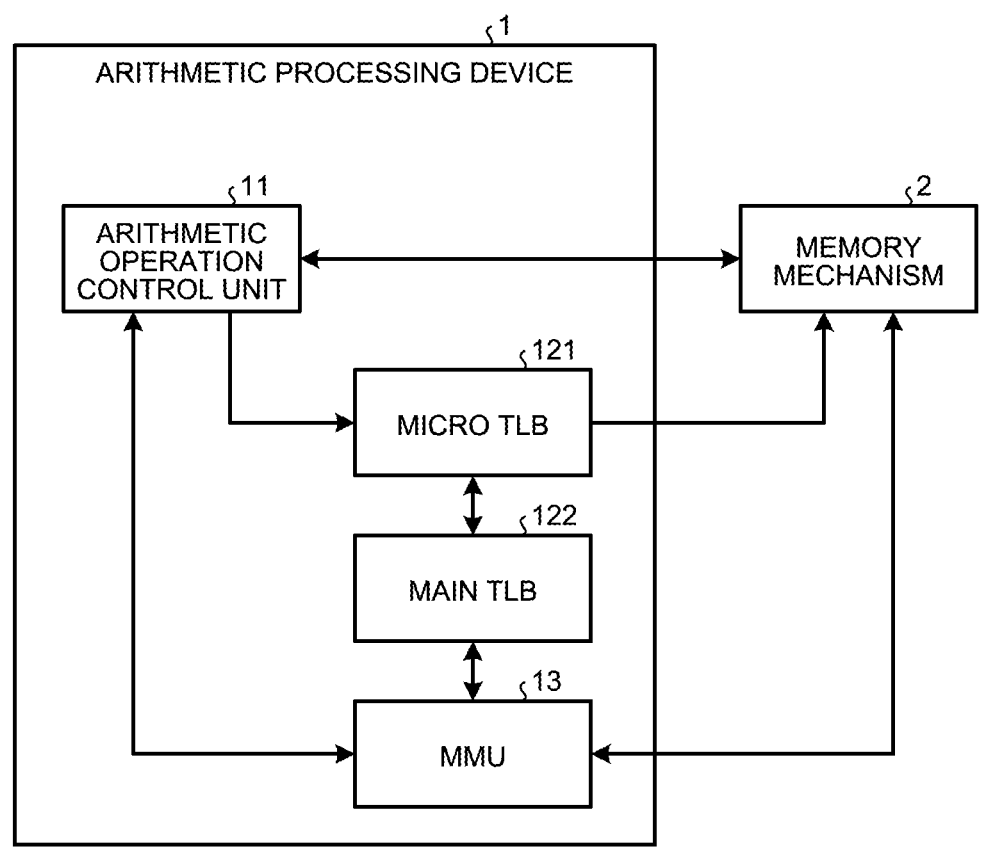
FIG. 10 is a block diagram illustrating an arithmetic processing device according to a third embodiment.

FIG. 10 is a block diagram illustrating an arithmetic processing device according to a third embodiment. The arithmetic processing device 1 according to the embodiment is different from the first embodiment in that the TLB 12 includes a plurality of hierarchies. The arithmetic processing device 1 according to the embodiment includes a micro TLB 121 and a main TLB 122. In a description below, a description of the function of each of the same unit as that described in the first embodiment will be omitted.

The micro TLB 121 is a high-speed and small-capacity buffer memory that is directly accessed from the arithmetic operation control unit 11. The micro TLB 121 mentioned here corresponds to an example of a "first management unit". The main TLB 122 is a low-speed buffer memory having the capacity greater than that of the micro TLB 121. The main TLB 122 mentioned here corresponds to an example of a "second management unit".

The outline of the process of a memory access will be described below. When the arithmetic operation control unit 11 performs a memory access, the arithmetic operation control unit 11 outputs a TLB request together with a virtual address to the micro TLB 121. Then, the virtual address is searched in the micro TLB 121 and, if a TLB hit occurs, the micro TLB 121 notifies the memory mechanism 2 of a physical address together with the TLB hit.

In contrast, if a TLB miss occurs in the micro TLB 121, a TLB request is sent to the main TLB 122 together with the virtual address. Then, the virtual address is searched in the main TLB 122 and, if a TLB hit occurs, the information on the hit TLB entry is registered in the micro TLB 121. Thereafter, the micro TLB 121 notifies the memory mechanism 2 of the physical address together with the TLB hit.

In contrast, if a TLB miss occurs in the main TLB 122, the virtual address and an address translation request are sent to the MMU 13. The MMU 13 performs a page table walk by using the virtual address and acquires the physical address associated with the virtual address. Then, the MMU 13 registers, in the TLB entry in the main TLB 122, the minimum accessible privilege level with respect to the virtual address, the acquired physical address, and the translation result in each stage. The main TLB 122 registers the registered TLB entry in the TLB entry in the micro TLB 121. Then, the micro TLB 121 notifies the memory mechanism 2 of the physical address together with the TLB hit.

Figure 11:
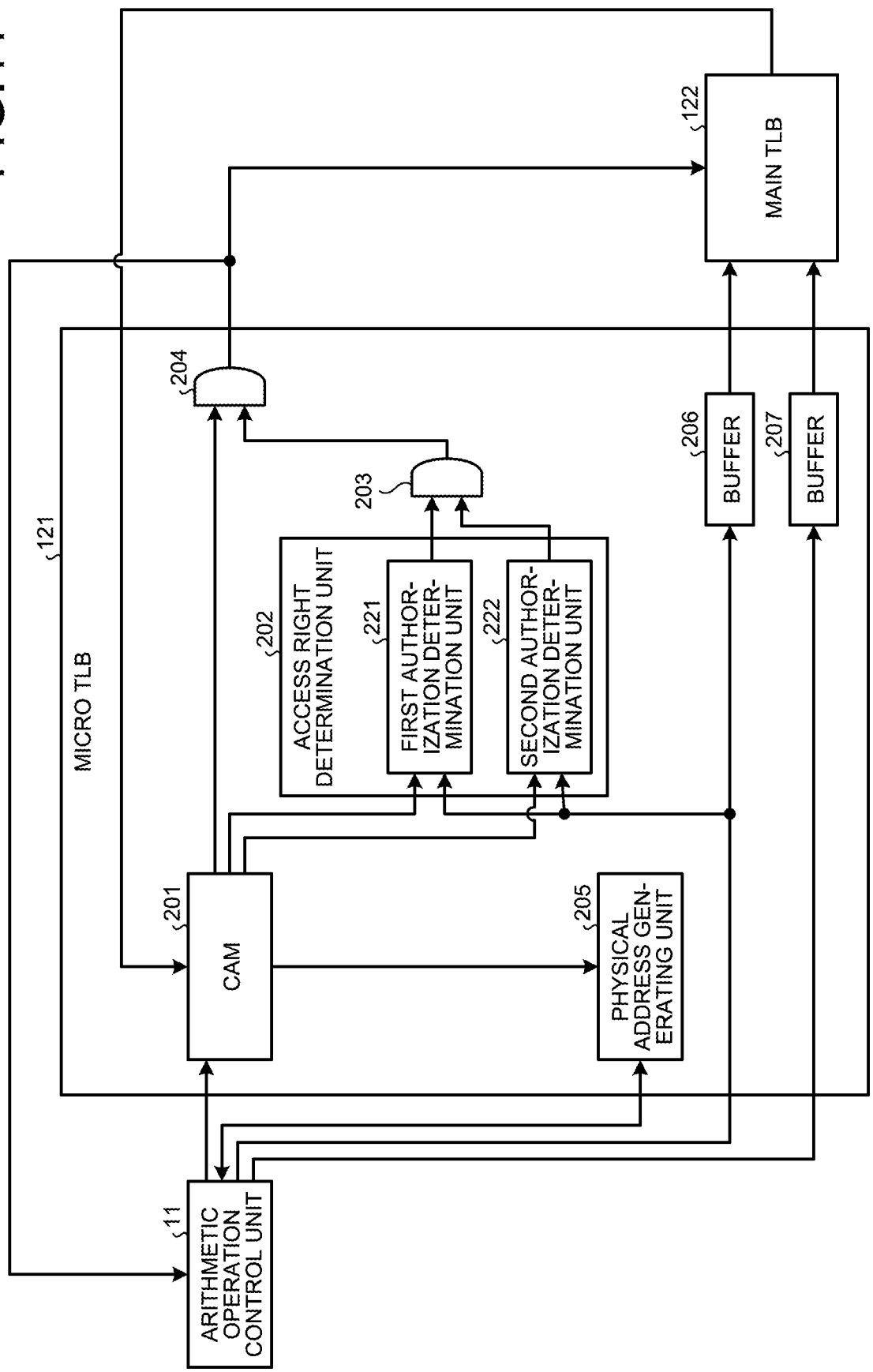
FIG. 11 is a block diagram illustrating a detail of a micro TLB according to the third embodiment.
Figure 12:
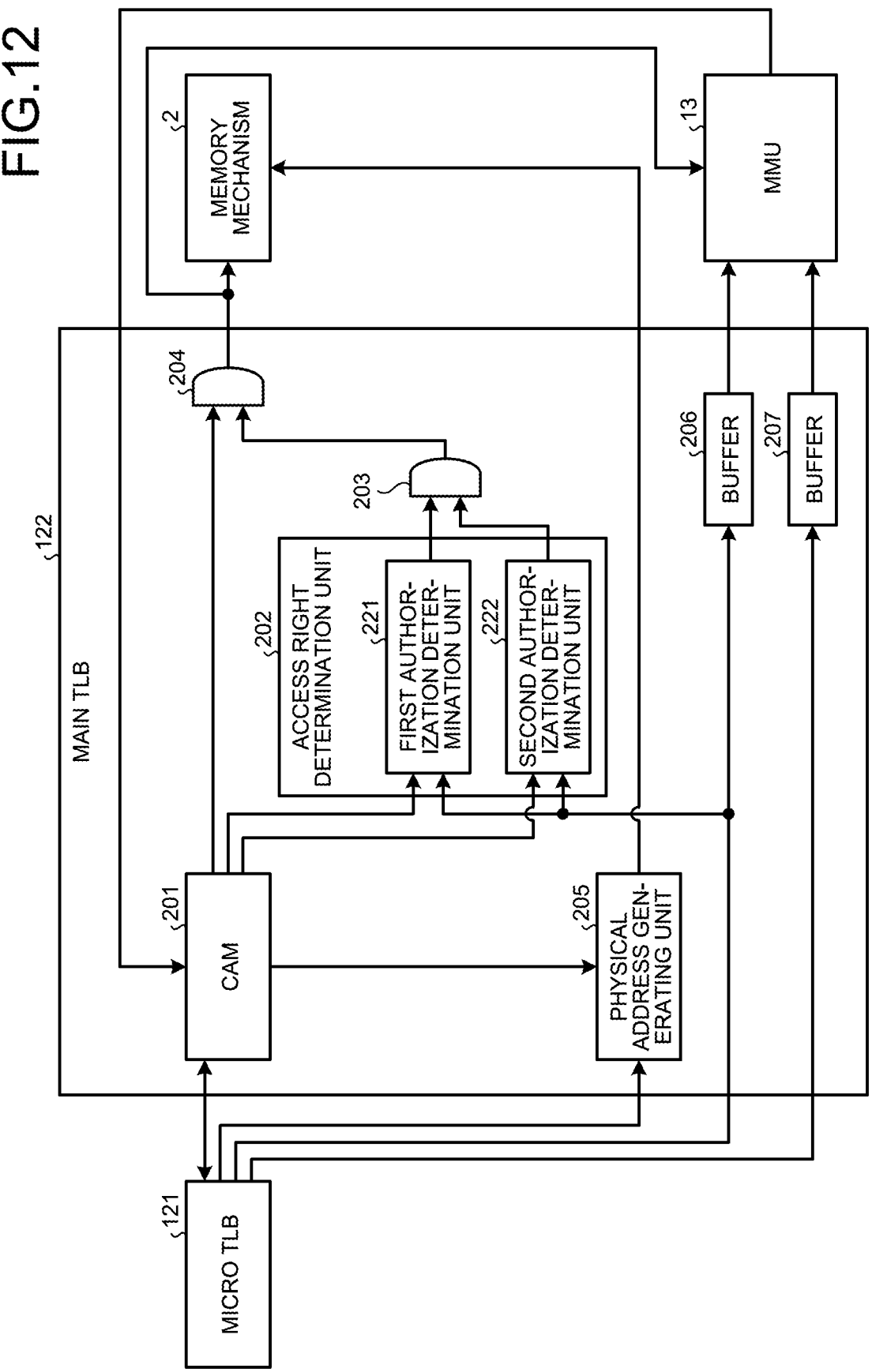
FIG. 12 is a block diagram illustrating a detail of a main TLB according to the third embodiment.

In the following, the micro TLB 121 and the main TLB 122 will be described in detail with reference to FIG. 11 and FIG. 12. FIG. 11 is a block diagram illustrating a detail of the micro TLB according to the third embodiment. Furthermore, FIG. 12 is a block diagram illustrating a detail of the main TLB according to the third embodiment.

The micro TLB 121 includes, as illustrated in FIG. 11, the CAM 201, the access right determination unit 202, the AND circuits 203 and 204, the physical address generating unit 205, and the buffers 206 and 207. Each of the units included in the micro TLB 121 having the same reference numerals as those in the first embodiment has the same function as that described in the first embodiment. All pieces of the information that specify the physical addresses associated with the virtual addresses stored in the CAM 201 in the micro TLB 121 corresponds to an example of "partial association information".

The AND circuit 204 outputs an enable or disable signal as a signal indicating a TLB hit to the memory mechanism 2. Furthermore, the signal output from the AND circuit 204 is inverted and input to the main TLB 122 as a signal for a TLB request. Namely, if an enable signal is output from the AND circuit 204 as the signal indicating a TLB hit, a disable signal is input to the main TLB 122 as a signal for a TLB request. Namely, in this case, the main TLB 122 does not receive an instruction for the TLB request. In contrast, if a disable signal is output from the AND circuit 204 as a signal indicating a TLB hit, an enable signal is input to the main TLB 122 as a signal for a TLB request. Namely, in this case, the main TLB 122 receives an instruction for the TLB request.

Furthermore, in a case where a TLB miss occurs and an access authorization violation does not occur, the CAM 201 receives an enable signal from the AND circuit 204 in the main TLB 122 as a signal indicating a TLB hit. Then, the CAM 201 receives an input of the information on the minimum accessible privilege level from the CAM 201 in the main TLB 122, receives an input of the physical address from the physical address generating unit 205 in the main TLB 122, and registers the TLB entry associated with the virtual address.

The main TLB 122 includes, as illustrated in FIG. 12, the CAM 201, the access right determination unit 202, the AND circuits 203 and 204, the physical address generating unit 205, and the buffers 206 and 207. Each of the units included in the main TLB 122 having the same reference numerals as those in the first embodiment has the same function as that described in the first embodiment.

The CAM 201 receives an input of a TLB request from the AND circuit 204 in the micro TLB 121. Furthermore, the CAM 201 receives an input of a virtual address from the buffer 207 in the micro TLB 121. Then, the CAM 201 performs a CAM search operation for searching for the input virtual address. Thereafter, the CAM 201 performs the same operation as that described in the first embodiment.

In a case where a CAM hit occurs and an access authorization violation does not occur, the AND circuit 204 enables the signal indicating a TLB hit and outputs the signal to the micro TLB 121. Then, if the micro TLB 121 receives an enable signal as the signal indicating a TLB hit, the CAM 201 outputs information on the minimum accessible privilege level to the micro TLB 121.

In contrast, in a case where a CAM miss or an access authorization violation occurs, the AND circuit 204 disables the signal indicating a TLB hit and outputs the signal to the micro TLB 121. In this case, an output of information on the minimum accessible privilege level from the CAM 201 and an output of a physical address from the physical address generating unit 205 with respect to the micro TLB 121 are not performed.

Furthermore, the signal indicating the TLB hit output from the AND circuit 204 is inverted and input to the MMU 13 as a signal for an address translation request. Namely, in a case where a CAM hit occurs and an access authorization violation does not occur, a disable signal is input to the MMU 13 as a signal for an address translation request. Furthermore, in a case where a CAM miss or an access authorization violation occurs, an enable signal is input to the MMU 13 as a signal for an address translation request.

The physical address generating unit 205 generates a physical address by using the virtual address that has been input from the micro TLB 121 and by using an upper layer portion of the physical address acquired from the CAM 201. Then, if the micro TLB 121 receives an enable signal as a signal indicating a TLB hit, the physical address generating unit 205 outputs the generated physical address to the micro TLB.

If at least one of a CAM miss and an address authorization violation occurs in the main TLB 122, the MMU 13 receives an input of an address translation request from the AND circuit 204 in the main TLB 122. Furthermore, the MMU 13 acquires a virtual address from the buffer 207 in the main TLB 122 and receives information on the processor privilege level from the buffer 206 in the main TLB 122. Thereafter, the MMU 13 performs a page table walk by using the acquired virtual address and the processor privilege level.

If an address authorization violation does not occur, the MMU 13 acquires the physical address associated with the virtual address and registers the acquired physical address in the TLB entry in the CAM 201 in the main TLB 122 together with the minimum accessible privilege level with respect to the translation result in each stage.

As described above, even in a case of multiple levels, such as the micro TLB 121 and the main TLB 122 in the arithmetic processing device 1 according to the embodiment, exception reporting is performed by the MMU 13. Consequently, even if a timing attack or the like is also received, it is difficult to determine whether a TLB entry is present in the TLB 12 based on a difference between processing time; therefore, it is possible to prevent vulnerability of the security of the TLB 12 and it is thus possible to improve the safety of the system.

Figure 13:
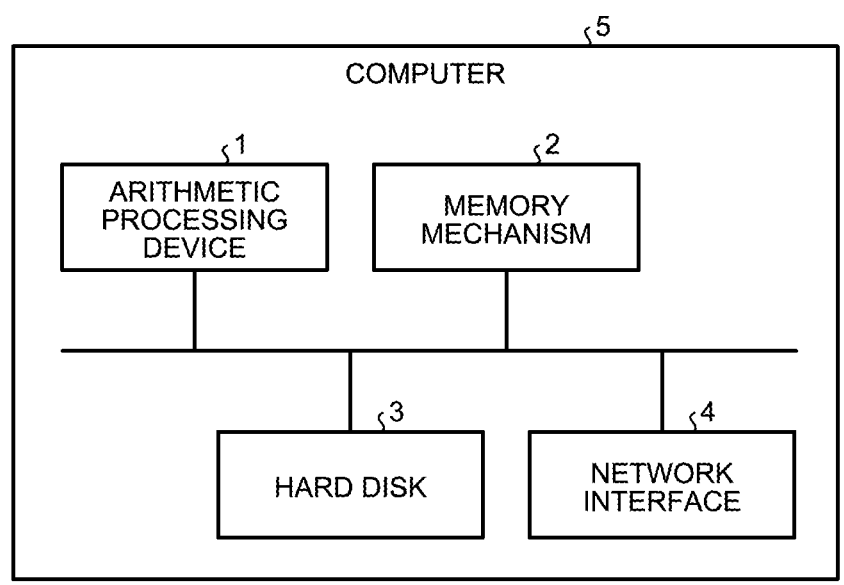
FIG. 13 is a diagram illustrating a hardware configuration of a computer.

Furthermore, a computer that includes the arithmetic processing device 1 described above in the embodiments will be described. FIG. 13 is a diagram illustrating a hardware configuration of the computer. A computer 5 mentioned here corresponds to an example of an "information processing apparatus".

As illustrated in FIG. 13, the arithmetic processing device 1 and the memory mechanism 2 described in each of the embodiments can be mounted on the computer 5. The computer 5 includes a hard disk 3, a network interface 4, and the like.

The network interface 4 is an interface that is used by the arithmetic processing device 1 to perform communication with an external device.

The arithmetic processing device 1 is connected to the memory mechanism 2, the hard disk 3, and the network interface 4 by a bus. The hard disk 3 stores therein various programs. The arithmetic processing device 1 reads various programs stored in the hard disk 3 and loads and executes the programs into a main storage unit included in the memory mechanism 2. When executing the programs, the arithmetic processing device 1 reads and writes data from and to the memory mechanism 2. At this time, the arithmetic processing device 1 performs exception reporting or a memory access by using the TLB 12, the MMU 13, and the like described in each of the embodiments.

According to an aspect of an embodiment, the present invention can improve the safety of the system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
an arithmetic operation control unit;
a first access management unit that receives, from the arithmetic operation control unit, an access request with respect to a first address and access authorization assigned to the access request, that translates the first address to a second address, that determines the suitability of the access authorization, and that outputs, when the access authorization is not suitable, the access request with respect to the first address;
a responding unit that determines, based on the first address, whether a predetermined process in which response time does not affect security is to be performed and that outputs, when the responding unit determines to perform the predetermined process, a result of the predetermined process to the arithmetic operation control unit; and
a second access management unit that receives the access request with respect to the first address output from the first access management unit, that translates the first address to the second address, that determines the suitability of the access authorization, and that outputs, when the access authorization is not suitable, a notification of access prohibition to the arithmetic operation control unit.

2. The arithmetic processing device according to claim 1, wherein
when the first access management unit does not hold information on the second address associated with the first address, the first access management unit outputs the access request with respect to the first address to the second access management unit, and when the second access management unit receives the access request with respect to the first address from the first access management unit, the second access management unit translates the first address to the second address.

3. The arithmetic processing device according to claim 1, wherein the first access management unit includes association information indicating association relationships between a plurality of the first addresses and the second addresses and translates the first addresses to the second addresses based on the association information, and the second access management unit translates the first addresses to the second addresses based on translation information that indicates each of the second addresses from the first addresses and that includes information that indicates each of the association relationships included in the association information held by a memory mechanism.

4. The arithmetic processing device according to claim 3, wherein the first access management unit includes a first management unit that includes partial association information that is a part of the association information, that receives the access request and the access authorization with respect to the first address from the arithmetic operation control unit, that translates, when the association relationship of the first address has been registered in the partial association information, the first address to the second address based on the partial association information, that determines the suitability of the access authorization, that outputs, when the access authorization is not suitable, the access request and the access authorization with respect to the first address, and that outputs, when the association relationship of the first address is not registered in the partial association information, the access request and the access authorization with respect to the first address, and a second management unit that receives the access request and access authorization with respect to the first address output by the first management unit, that translates, when the association relationship of the first address has been registered in the association information, the first address to the second address based on the association information, that determines the suitability of the access authorization, that outputs, when the access authorization is not suitable, the access request with respect to the first address to the second access management unit, and that outputs, when the association relationship of the first address is not registered in the association information, the access request and the access authorization with respect to the first address to the second access management unit.

5. The arithmetic processing device according to claim 1, further comprising a responding unit that determines, based on the first address, whether or not a predetermined process in which response time does not affect security is to be performed and that outputs, when the responding unit determines to perform the predetermined process, a result of the predetermined process to the arithmetic operation control unit.

6. The arithmetic processing device according to claim 1, wherein the second access management unit outputs information indicating a cause of the access prohibition together with the notification of the access prohibition.

7. An information processing apparatus comprising:
an arithmetic processing device; and
a memory mechanism, wherein
the memory mechanism has translation information that leads a second address from a first address, and
the arithmetic processing device includes
an arithmetic operation control unit,
a first access management unit that receives an access request with respect to the first address and access authorization assigned to the access request from the arithmetic operation control unit, that translates the first address to the second address based on association information indicating an association relationship between the first address and the second address, that determines the suitability of the access authorization, and that outputs, when the access authorization is not suitable, the access request with respect to the first address,
a responding unit that determines, based on the first address, whether a predetermined process in which response time does not affect security is to be performed and that outputs, when the responding unit determines to perform the predetermined process, a result of the predetermined process to the arithmetic operation control unit; and
a second access management unit that receives the access request with respect to the first address output from the first access management unit, that acquires the second address from the first address based on the translation information included in the memory mechanism, that determines the suitability of the access authorization, and that outputs, when the access authorization is not suitable, a notification of access prohibition to the arithmetic operation control unit.

8. A method of controlling an arithmetic processing device that includes an arithmetic operation control device, a first access management device, and a second access management device, the method for controlling the arithmetic processing device comprising:
receiving, performed by the first access management device, an access request with respect to a first address and access authorization assigned to the access request from the arithmetic operation control device;
translating, performed by the first access management device, the first address to a second address;
determining, performed by the first access management device, the suitability of the access authorization;
outputting, performed by the first access management device, when the access authorization is not suitable, the access request with respect to the first address to the second access management device;
determining, performed by the first access management device, based on the first address, whether a predetermined process in which response time does not affect security is to be performed and that outputs, when determining to perform the predetermined process, a result of the predetermined process to the arithmetic operation control device;
receiving, performed by the second access management device, the access request with respect to the first address from the first access management device;
translating, performed by the second access management device, the first address to the second address;

determining, performed by the second access management device, the suitability of the access authorization; and outputting, performed by the second access management device, when the access authorization is not suitable, a notification of access prohibition to the arithmetic operation control device.

\* \* \* \* \*